United States Patent
Tandberg et al.

(10) Patent No.: US 11,286,745 B2
(45) Date of Patent: Mar. 29, 2022

(54) SUBSEA ACTUATOR WITH OVERRIDE FUNCTION, AS WELL AS A METHOD OF OPERATING AN ACTUATOR

(71) Applicant: FMC Kongsberg Subsea AS, Kongsberg (NO)

(72) Inventors: Geir Tandberg, Tranby (NO); Øivind Rokne, Notodden (NO)

(73) Assignee: FMC Kongsberg Subsea AS, Kongsberg (NO)

( * ) Notice: Subject to any disclaimer, the term of this patent is extended or adjusted under 35 U.S.C. 154(b) by 71 days.

(21) Appl. No.: 16/962,835

(22) PCT Filed: Jan. 11, 2019

(86) PCT No.: PCT/EP2019/050627
§ 371 (c)(1),
(2) Date: Jul. 16, 2020

(87) PCT Pub. No.: WO2019/141595
PCT Pub. Date: Jul. 25, 2019

(65) Prior Publication Data
US 2021/0363857 A1    Nov. 25, 2021

(30) Foreign Application Priority Data

Jan. 18, 2018 (NO) .................................. 20180084

(51) Int. Cl.
*E21B 34/04* (2006.01)
*F16K 31/04* (2006.01)
(Continued)

(52) U.S. Cl.
CPC .......... *E21B 34/045* (2013.01); *F16K 3/0254* (2013.01); *F16K 31/047* (2013.01); *F16K 31/143* (2013.01)

(58) Field of Classification Search
CPC .............................. F16K 31/047; E21B 34/045
See application file for complete search history.

(56) References Cited

U.S. PATENT DOCUMENTS

| 4,213,480 A | 7/1980 | Orum et al. |
| 6,446,660 B1 * | 9/2002 | Goni Usabiaga ......... F16K 1/04 137/243.6 |

(Continued)

*Primary Examiner* — Eric Keasel (57) ABSTRACT

It is described a subsea electric actuator (100) operating a linear valve (200), the actuator (100) comprising a roller-screw (2) for translating a rotational movement of a motor (3) to a linear movement of a gate rod (4) operating the valve (200), the actuator (100) comprising: —an actuator housing (101); —an outer roller screw part (2') rotationally connected to the motor (3) and comprising internal threads forming a first part of a first connection (10), —an inner roller screw part (2") comprising external threads forming a second part of the first connection (10) and being arranged inside the outer roller screw part (2'), a surface of the inner roller screw part (2") having a first interface forming a first part of a second connection (20'; 20") connecting the inner roller screw part (2") to a non-rotational part of the actuator (100), the second connection (20', 20") is configured to rotationally lock the inner roller screw part (2') giving linear movement of the inner roller screw part (2") when the outer roller screw (2') is rotated, —a gate rod (4) arranged axially movable inside the inner roller screw part (2"), the external surface of the gate rod (4) comprising an interface forming a first part of a third connection (30'; 30"), —an override housing (6) arranged outside the gate rod (4) and adjacent the inner roller screw part (2") forming an axial stop for the inner roller screw part (2"), the override housing (6) comprising an interface forming a second part of the third connection (30'; 30"), and wherein, when the third connection (30'; 30") is connected, the inner roller screw part (2") is locked to the gate rod (4) such that the gate rod (4) follows any axial movement of the inner roller screw part (2"), and (Continued)

when the third connection (30'; 30") is disconnected, the gate rod (4) is allowed to move in the axial direction relative the inner roller screw part (2") such that the linear valve (200) can be operated independently of the motor (3), outer roller screw part (2') and inner roller screw part (2"). It is further described a method of performing override of a subsea electric actuator (100).

13 Claims, 10 Drawing Sheets

(51) Int. Cl.
  *F16K 31/143* (2006.01)
  *F16K 3/02* (2006.01)

(56) References Cited

U.S. PATENT DOCUMENTS

| | | | |
|---|---|---|---|
| 6,585,227 B2 | 7/2003 | Newport et al. | |
| 6,585,228 B1 | 7/2003 | McCaskill | |
| 9,500,294 B2 * | 11/2016 | Herman | F16K 31/1225 |
| 9,518,672 B2 * | 12/2016 | Martino | F16K 17/38 |
| 9,920,852 B2 * | 3/2018 | Garrone | F16K 31/047 |
| 2011/0308619 A1 | 12/2011 | Martino et al. | |
| 2015/0069275 A1 | 3/2015 | Herman et al. | |
| 2015/0369001 A1 | 12/2015 | Hoang | |

\* cited by examiner

SUBSEA ACTUATOR WITH OVERRIDE FUNCTION, AS WELL AS A METHOD OF OPERATING AN ACTUATOR

The invention relates to a subsea actuator for a valve in a subsea installation, as well as a method of operating an actuator.

BACKGROUND OF THE INVENTION

Subsea X-mas trees normally comprise a number of pressure-tight fluid-barriers ensuring the fluid and thus the pressure in the well is kept under control. However, from time to time the X-mas trees need maintenance or need to be pulled to surface for other reasons. In such situations, the barriers formed by the X-mas trees against uncontrolled release of well fluids are removed and have to be replaced by other temporary barriers. Such temporary barriers are normally installed in pressure containing bores below the X-mas tree, and is done by accessing the area below the X-mas tree through dedicated bores in the X-mas tree. Accessibility to the well through the dedicated bores is allowed or restricted using one or more gate valves arranged at different locations of the individual dedicated bores. The gate valves normally move between two operating positions, which two positions corresponds to a) an open position of the gate valve where the bore is open (i.e. the area below the gate valve is accessible), and b) a closed position of the gate valve where the bore is closed (i.e. the area below the gate valve is not accessible).

In order to be able to retrieve the X-mas trees from a location subsea to a topside location, the temporary plugs need to be installed first in order to safely leave the well and control the pressure of the well. However, for the temporary plugs to be installed, access to the area below the X-mas tree is necessary. In case of malfunction of the actuator operating a gate valve in the bore where access is desired, it is normal to have an override function on the actuator such that one may manually open the desired gate valve thereby opening the bore for access to the well and installation of any temporary plug(s). After the temporary plugs are installed and the pressure of the well is under control, the X-mas tree can be retrieved.

In electrically operated X-mas trees the actuators are electrically operated and the invention regards a wholly electric operated actuator for instance operating a gate valve. The invention takes advantage of a roller screw configuration comprising a planetary roller screw, which roller screw benefits from the high load capability, easy integration and control, high-precision, high-speed, and positive environmental impact. The planetary roller screw, also named satellite roller screw, is a low friction precision screw-type actuator, which converts rotational motion of an outer rotating screw into linear motion of a concentrically arranged rod (or vice versa) e.g. by a threaded connection between the inside of the outer rotating screw and the outside of the concentrically arranged rod. Planetary roller screws are used as the actuating mechanism in many electro-mechanical linear actuators.

Such roller screw solutions do not often get stuck but it might happen, and with subsea application and use of such a configuration on a valve on a X-mas tree, there is a need for an override functionality should the roller screw not operate properly.

One such prior art roller screw is disclosed in U.S. Pat. No. 6,585,227 B2 describing an override solution for a hydraulic actuator, where the whole roller screw housing is moved together with the stem by hydraulics to override a fault in the roller screw.

It is an objective of the invention to be able to operate the gate valve to an open position in case of failure the roller screw mechanism in the actuator to secure access to the area below the gate valve for installing temporary plug(s).

More specific, it is an objective of the invention to provide an override function for a subsea electric actuator having a roller-screw configuration, if the rotating screw is stuck and not able to move an inner rod thereby not being able to operate the valve.

SUMMARY OF THE INVENTION

The invention is set forth in the independent claims, while the dependent claims define other characteristics of the invention.

The motor is connected to a motor axle, preferably via one or more gearboxes for transferring motor force to a stem rotationally connected to a rotating component such as a rotating valve (ball valve).

Examples of areas of use of the subsea electric actuator with a roller screw mechanism according to the invention, may be in any subsea actuator where the actuator shall provide a linear force to an element. Typically, such use is in the operation of valves, and in particular gate valves. This kind of actuators normally forms part of X-mas trees, for example any vertical X-mas trees, such as Enhanced Vertical Deepwater Tree (EVDT), but also in horizontal X-mas trees.

The invention relates to a subsea electric actuator operating a linear valve, the actuator comprising a roller-screw for translating a rotational movement of a motor to a linear movement of a gate rod operating the valve, the actuator comprising:
  an actuator housing;
  an outer roller screw part rotationally connected to the motor and comprising internal threads forming a first part of a first connection,
  an inner roller screw part comprising external threads forming a second part of the first connection and being arranged inside the outer roller screw part, a surface of the inner roller screw part having a first interface forming a first part of a second connection connecting the inner roller screw part to a non-rotational part of the actuator, the second connection is configured to rotationally lock the inner roller screw part giving linear movement of the inner roller screw part when the outer roller screw is rotated,
  a gate rod arranged axially movable inside the inner roller screw part, the external surface of the gate rod comprising an interface forming a first part of a third connection,
  an override housing arranged outside the gate rod and adjacent the inner roller screw part forming an axial stop for the inner roller screw part, the override housing comprising an interface forming a second part of the third connection, and wherein, when the third connection is connected, the inner roller screw part is locked to the gate rod such that the gate rod follows any axial movement of the inner roller screw part, and when the third connection is disconnected, the gate rod is allowed to move in the axial direction relative the inner roller screw part such that the linear valve can be operated independently of the motor, outer roller screw part and inner roller screw part.

In an aspect, the invention relates to a subsea electric actuator operating a linear valve, the actuator comprising a roller-screw for translating a rotational movement of a motor to a linear movement of a gate rod operating the valve, the actuator comprising:
- an actuator housing;
- an outer roller screw part rotationally connected to the motor and comprising internal threads forming a first part of a first connection,
- an inner roller screw part comprising external threads forming a second part of the first connection and being concentrically arranged inside the outer roller screw part, the internal surface of the inner roller screw part having a first interface forming a first part of a second connection,
- a gate rod concentrically arranged inside the inner roller screw part, the external surface of the gate rod comprising:
  - a second interface forming a second part of the second connection towards the inner roller screw part,
  - a first stop face at a first end portion for interaction with the inner roller screw part, and
  - external threads forming a first part of a third connection provided at an opposite second end portion of the inner roller screw part relative the first stop face,
- an override housing concentrically arranged outside the gate rod and adjacent the inner roller screw part forming a second stop face for the inner roller screw part, the override housing comprising internal threads forming a second part of the third connection, wherein the second connection allows relative axial movement between the gate rod and the inner roller screw part and prevents rotational movement between the gate rod and the inner roller screw part, and
wherein, when the third connection is connected, the inner roller screw part is locked to the gate rod such that the gate rod follows any axial movement of the inner roller screw part, and when the third connection is disconnected, the gate rod is allowed to move in the axial direction relative the inner roller screw part such that the linear valve can be operated independently of the motor, outer roller screw part and inner roller screw part. I.e. in other words, in accordance with this aspect of the subsea electric actuator, the surface of the inner roller screw part is on an internal surface of the inner roller screw part and the non-rotational part of the actuator is the gate rod, and wherein the gate rod comprises:
- a second interface forming a second part of the second connection towards the inner roller screw part,
- a first stop face at a first end portion for interaction with the inner roller screw part, and
- the interface on the external surface of the gate rod comprises external threads, the interface is provided at an opposite second end portion of the inner roller screw part relative the first stop face, and wherein,
the override housing is arranged outside the gate rod and adjacent the inner roller screw part forming a second stop face for the inner roller screw part, the interface on the override housing comprising internal threads forming a second part of the third connection.

In a second aspect, the surface of the inner roller screw part is on an external surface of the inner roller screw part and the non-rotational part of the actuator is a bonnet or a front cap in the actuator housing, forming the second connection, wherein the interface on the external surface of the gate rod comprises a groove for receiving locking dog(s) in the override housing, thereby axially locking the gate rod, the inner roller screw part and the override housing relative each other through the third connection.

The motor can be an electric motor.

In accordance with an aspect, the linear valve is a gate valve operated by a gate element.

In accordance with an aspect, the second connection is a spline connection. Alternatively, or as an embodiment of the spline connection, the second connection can be key(s) slidably arranged in complementary formed recess(es) etc. The key(s) can be arranged on the gate rod while the recess(es) can be arranged on the inner roller screw part, or vice versa.

In an aspect, the override function is a one-way override function operating the linear valve to an open position of the valve. I.e. an override tool is only capable of operating the linear valve to operate in one axial direction corresponding to a direction towards opening of the linear valve such as to provide access to a bore below the linear valve.

In an aspect, the override function is a two-way override function operating the linear valve to an open position of the valve or a closed position of the valve.

In an aspect, the override housing comprises an interface for connection with an override tool, and wherein the override tool comprises a rotation device for rotating the override housing relative the gate rod such as to disconnect the third connection and a pushing tool for pushing the gate rod when the third connection has been disconnected. The override tool may be connected to a Remotely Operated Vehicle (ROV) (in deeper water) or may be operated by a diver (in shallow water).

In an aspect, the override housing comprises a stopper for interaction with a stopper surface of the actuator housing, wherein the stopper surface prevents axial movement of the gate rod and override housing in a first direction when the third connection is disconnected. Thus, the stopper surface prevents the override housing to be axially displaced relative the gate rod. Furthermore, the stopper surface and stopper may also function as a restriction for movement of the override housing in one axial direction. holding-on tool for the such that the gate rod can be pushed towards a position representing an open position of the valve.

In an aspect, the pushing tool include hydraulic operation by fluid pressure acting on a piston in the override tool, wherein the piston may be connected to a first end of a piston rod and where a second end of the piston rod is in connection with a first end portion of the gate rod, and when hydraulic fluid pressure is applied to the piston, the piston and piston rod are moved axially thereby pushing the gate rod and the linear valve (i.e. the gate element) axially, towards an open position of the linear valve.

Alternatively, a one-way or two-way override function can be achieved by connecting a mechanical tool to the gate rod (e.g. by threaded connection, J-slot connection, T-connection etc.) thereby axial movement of the mechanical tool in any direction is transferred to the gate rod.

In an aspect, the linear valve is adapted to open or close a bore in which the linear valve is arranged by moving the linear valve perpendicular to an axial extension of the bore. Furthermore, in a first position of the linear valve, the bore is open and access through the bore is allowed, and in a second position of the linear valve, the bore is closed and access through the bore is restricted.

The invention further relates to a method of performing override of a subsea electric actuator as defined above, the actuator operating a linear valve, wherein the method comprises the steps of:

connecting an override tool to an interface on the override housing, the override tool comprising a rotation device and a pushing tool, operating the rotation device to rotate the override housing relative the gate rod such as to disconnect the third connection, operating the pushing tool to push the gate rod and the linear valve in an axial direction relative the inner roller screw part thereby operating the linear valve independently of the motor, outer roller screw part and inner roller screw part.

In an aspect of the method, the pushing tool comprises hydraulic operation by fluid pressure acting on a piston in the override tool, wherein the piston is connected to a first end of a piston rod and where a second end of the piston rod is in connection with a first end portion of the gate rod, and the method comprises the step of:

applying hydraulic fluid pressure to the piston such as to axially move the piston and piston rod to push the gate rod and the linear valve towards an open position of the linear valve.

It is obvious for the person skilled in the art that the different features in the different aspects or embodiments may be combined in any way.

BRIEF DESCRIPTION OF THE FIGURES

The invention will now be described in non-limiting embodiment, with reference to the accompanying Figures wherein.

DETAILED DESCRIPTION OF THE FIGURES

In the following, a first and second aspect of the invention will be described in greater detail. However, most of the components are common for the two aspects, thus, features described only in relation to one of the aspects are in most cases valid for the other aspect as well, except for the features which are obviously different in the different aspects.

First Aspect of the Invention, FIGS. 1-5

Figure 1:
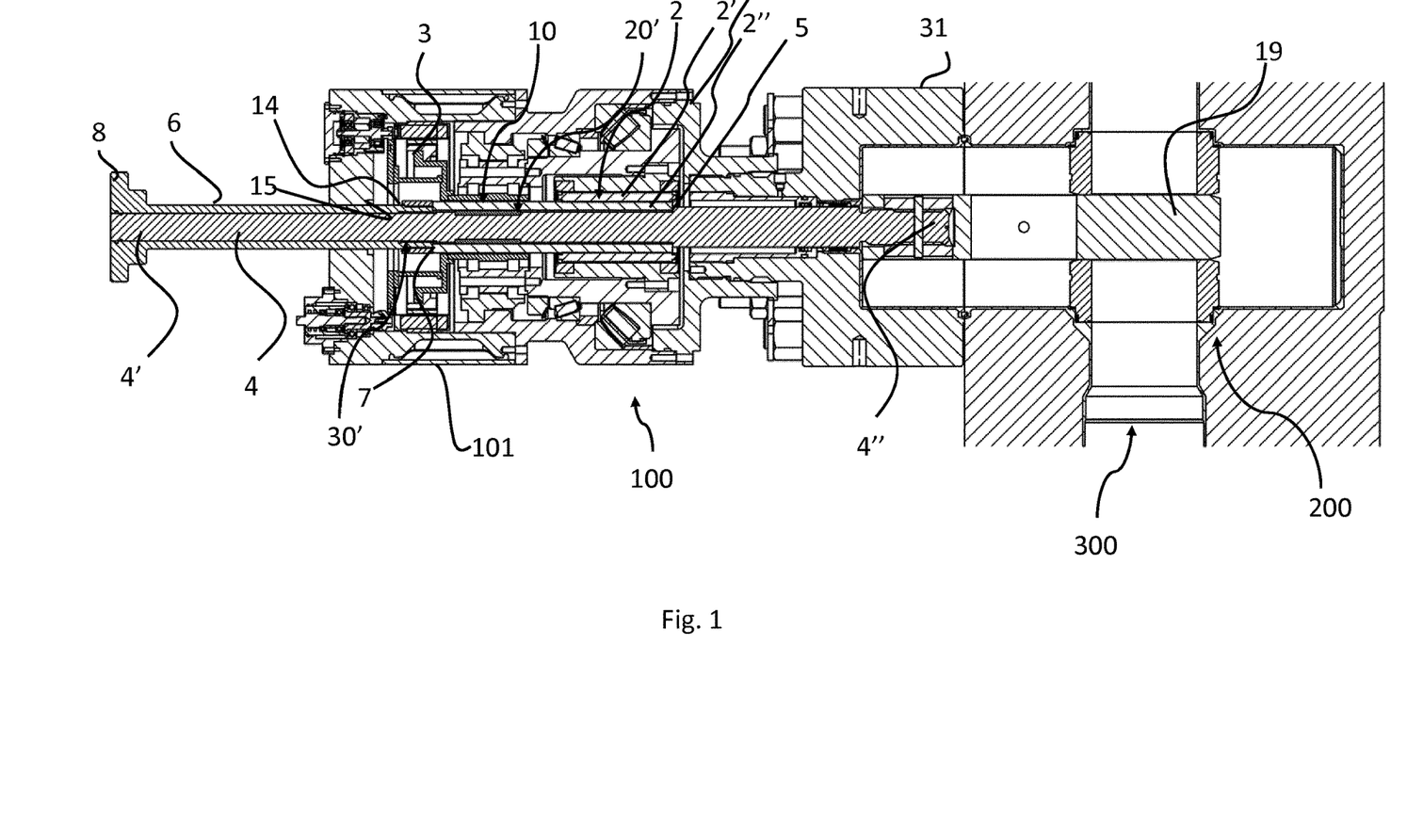
FIG. 1 is an overview of a first aspect of a subsea electric actuator according to the present invention in normal operation with the linear valve in a closed position, i.e. a position where access to the area below the valve is restricted.
Figure 2:
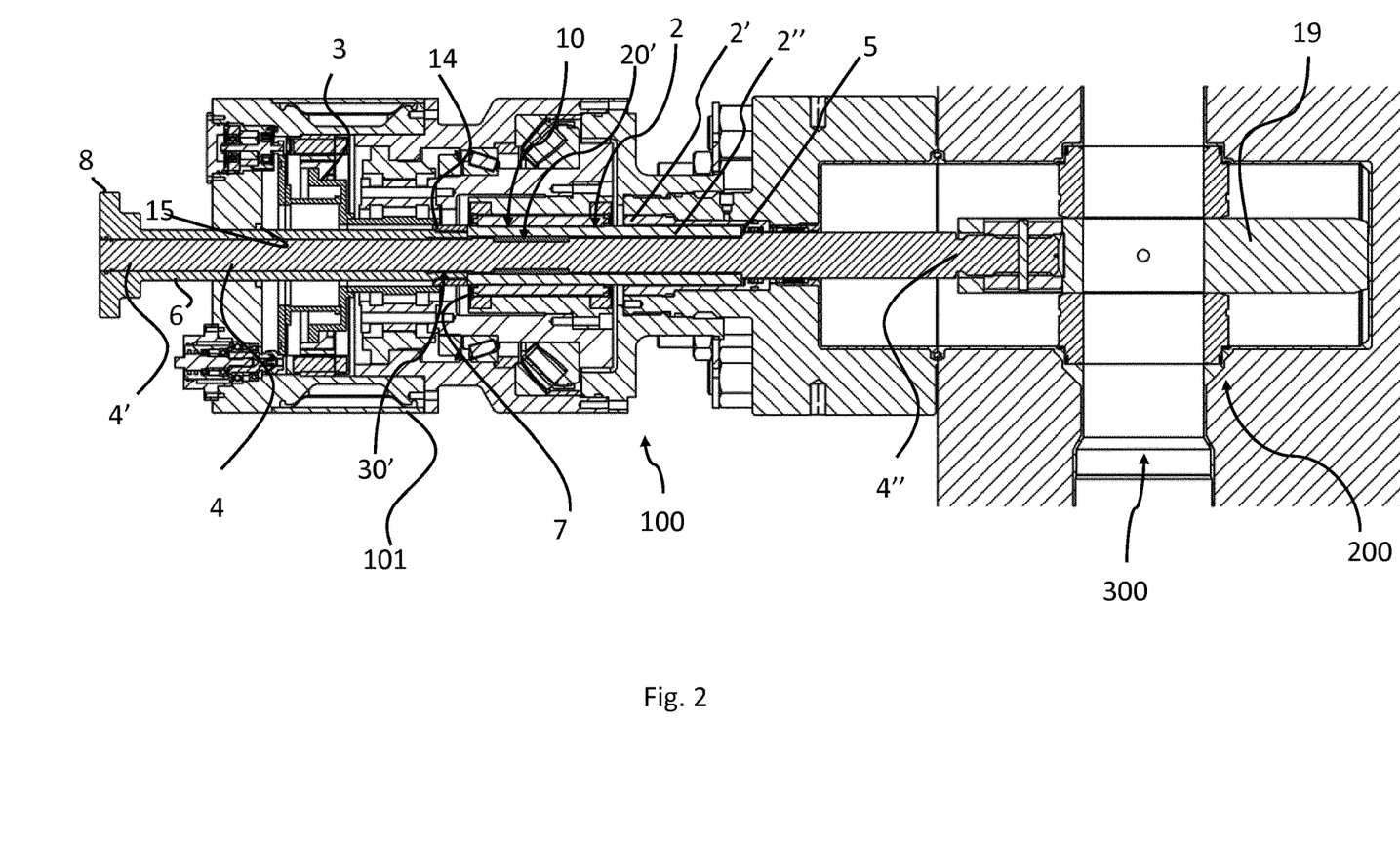
FIG. 2 is an overview of a subsea electric actuator according to a first aspect of the present invention in normal operation with the linear valve in an open position, where access to the area below the valve is allowed.

FIG. 1 is an overview of a subsea electric actuator according to the present invention in normal operation with the linear valve in a closed position, where access to the area below the valve is restricted, whereas FIG. 2 is an overview of a subsea electric actuator according to the present invention in normal operation with the linear valve in an open position, where access to the area below the valve is allowed.

With reference to FIGS. 1 and 2 it is disclosed a subsea electric actuator 100 operating a linear valve 200, e.g. a gate element 19 movable in a direction perpendicular to the bore 300, such that the gate element 19 in a first position closes the bore (FIG. 1) thereby preventing access to an area below the linear valve 200 (a closed position of the linear valve 200), and in a second position is position outside the cross section of the bore 300 (FIG. 2) thereby allowing access to the area below the linear valve 200 (an open position of the linear valve 200).

The actuator 100 comprises a roller-screw 2 for translating a rotational movement of a motor 3 to a linear movement of a gate rod 4 operating the valve 200. As used herein, both the terms operating the linear valve 200 and operating the gate element 19 have the same meaning, i.e. access to the area below the linear valve is either prevented or allowed. The actuator 100 comprises an actuator housing 101 and an outer roller screw part 2' rotationally connected to the motor 3. The outer roller screw part 2' comprises internal threads (threads not shown) forming a first part of a first connection 10. The actuator 100 further comprises an inner roller screw part 2" comprising external threads (threads not shown) forming a second part of the first connection 10. The inner roller screw part 2" is concentrically arranged inside the outer roller screw part 2'. The internal surface of the inner roller screw part 2" has a first interface forming a first part of a second connection 20'.

The actuator 100 further comprises a gate rod 4 concentrically arranged inside the inner roller screw part 2". An external surface of the gate rod 4 comprises: a second interface forming a second part of the second connection 20' towards the inner roller screw part 2", a first stop face 5 at a first end portion for interaction with the inner roller screw part 2", and external threads forming a first part of a third connection 30' provided at an opposite second end portion of the inner roller screw part 2" relative the first stop face 5. The actuator 100 further comprises an override housing 6 concentrically arranged outside the gate rod 4 and adjacent the inner roller screw part 2" forming a second stop face 7 for the inner roller screw part 2". Thus, the distance between the first stop face 5 and the second stop face 7 is equal to the axial length of the inner roller screw part 2" when the third connection 30' is connected such that the inner roller screw part 2" abuts the first and second stop faces 5, 7. Thus, the first and second stop faces 5, 7 lock the inner roller screw part 2" in a normal operation of the electric actuator 100. The override housing 6 comprises internal threads forming a second part of the third connection 30'. The second connection 20' allows relative axial movement between the gate rod 4 and the inner roller screw part 2" and prevents rotational movement between the gate rod 4 and the inner roller screw part 2". This second connection 20' can for example be a spline connection (see details in FIGS. 5A and 5B). When the third connection 30' is connected, the inner roller screw part 2" is locked to the gate rod 4 such that the gate rod 4 follows any axial movement of the inner roller screw part 2", and when the third connection 30' is disconnected, the gate rod 4 is allowed to move in the axial direction relative the inner roller screw part 2" such that the linear valve 200 can be operated independently of the motor 3, outer roller screw part 2' and inner roller screw part 2".

The different components and their operational relationship is described in greater detail in the following.

A first end portion 4' of the gate rod 4 is in connection with an override housing 6 and a second end portion 4" of the gate rod 4 is in connection with a gate element 19 in linear valve 200. The override housing 6 has internal threads. The internal threads of the override housing 6 provides for a threaded connection with the external threads on the external surface of the gate rod 4, i.e. a third connection 30'. As indicated above, the override housing 6 comprises a second stop face 7 for preventing axial movement of the inner roller screw part 2" relative to the gate rod 4. A part of the override housing 6 accessible from an outside may comprise an interface 8 manipulatable by e.g. a override tool 9 (see FIGS. 3C, 4A, 4B) operable by ROV (Remotely Operated Vehicle) or a diver, dependent on the water depth. The interface 8 allows rotational movement of the override housing 6 relative the gate rod 4 by the override tool 9, thereby disconnecting the third connection 30'.

Figure 3A:
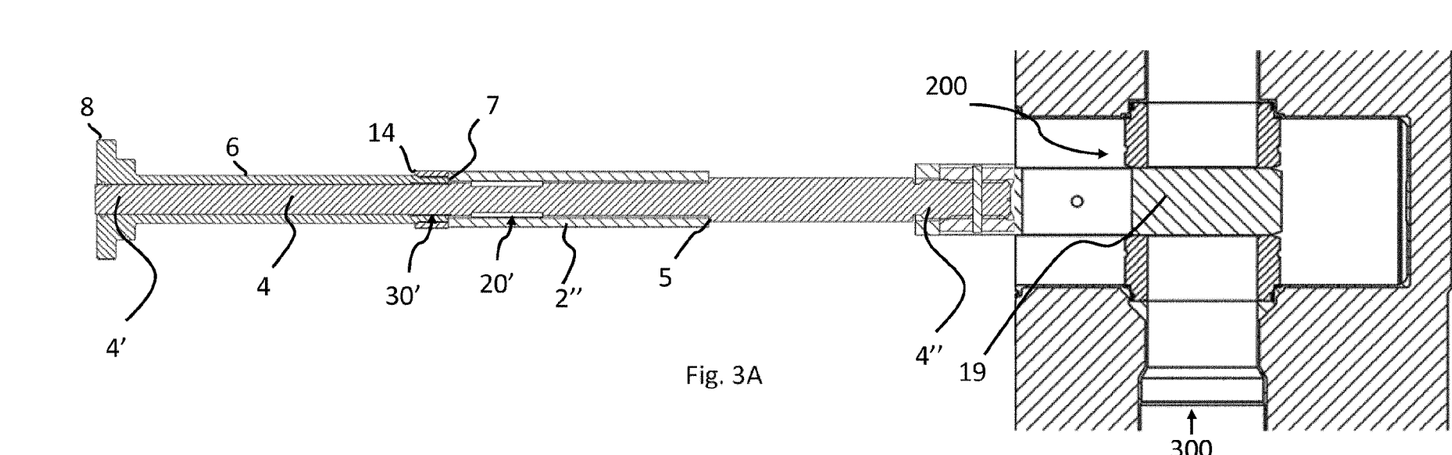
FIG. 3A shows details of the relationship between gate rod, third connection, inner roller screw part, first and second stop faces during normal operation of the actuator according to the first aspect of the present invention, in a closed position of the linear valve.
Figure 3B:
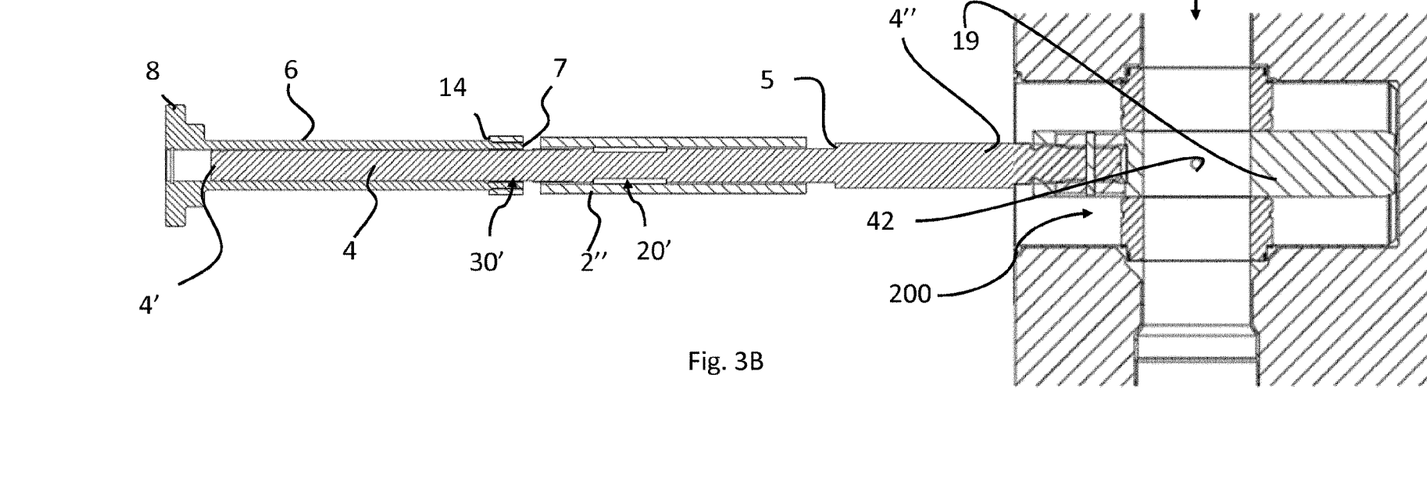
FIG. 3B shows details of the relationship between gate rod, third connection, inner roller screw part, first and second stop faces in an override mode after disconnection of the third connection in the first aspect of the actuator, in an open position of the linear valve.

With reference to FIGS. 3A and 3B, where FIG. 3A shows details of the relationship between gate rod 4, third connection 30', inner roller screw part 2", first and second stop faces 5, 7 during normal operation of the actuator 100, in a closed position of the linear valve 200, and FIG. 3B shows details of the relationship between gate rod 4, third connection 30', inner roller screw part 2", first and second stop faces 5, 7 in an override mode after disconnection of the third connection 30' in the actuator 100, in an open position of the linear valve 200, represented by the hole 42 in the gate valve 200. When the override housing 6 is connected to the gate rod 4 and the third connection 30' is connected (FIG. 3A), i.e. during normal operation of the actuator 100, the inner roller screw part 2" is in a locked axial position relative the gate rod 4, where a first end of the inner roller screw part 2" is in contact with the first stop face 5 on the gate rod 4 and an opposite second end of the gate rod 4 is in contact with the second stop face 7 on the override housing 6. Thus, if the inner roller screw part 2" moves linearly, the gate rod 4 follows this movement, i.e. they operate as a single element. In this normal operation, the outer roller screw part 2' rotates by input from a motor 3 via a gear, which rotational movement is converted to a linear movement of the inner roller screw part 2" relative the outer roller screw part 2', and thus the gate rod 4 is moved along with the inner roller screw part 2". The first and second stop faces 5, 7 provide for the locked relationship of the inner roller screw part 2" and the gate rod 4 in the normal operation.

However, in an emergency situation, ref. FIG. 3B, where the outer roller screw part 2' is not rotating, for example due to jamming, the actuator 100 has an override function which secures that the linear valve 200 can be operated to an open position where access to an area below the linear valve 200 is obtained.

Figure 3C:
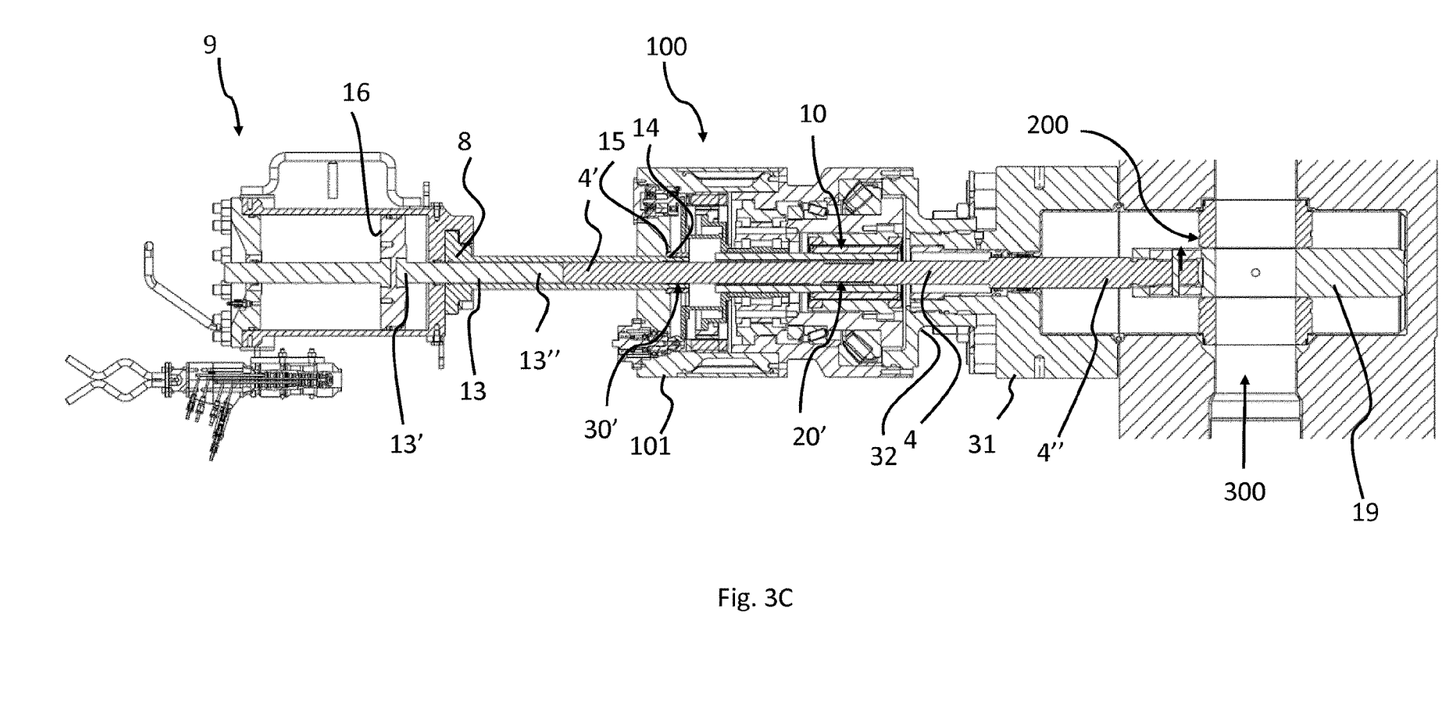
FIG. 3C shows an overview of the override mode when the override tool has manipulated the valve element to an open position of the linear valve (relative FIG. 3A), according to a first aspect of the present invention.
Figure 4A:
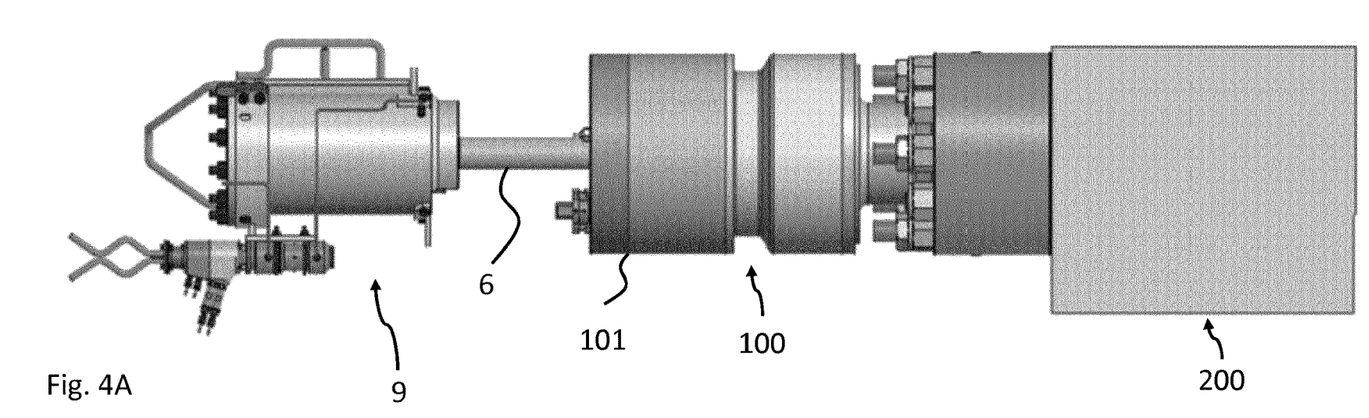
FIG. 4A is a side-view of the subsea electric actuator according to a first aspect of the invention, where an override tool is connected to the subsea electric actuator.
Figure 4B:
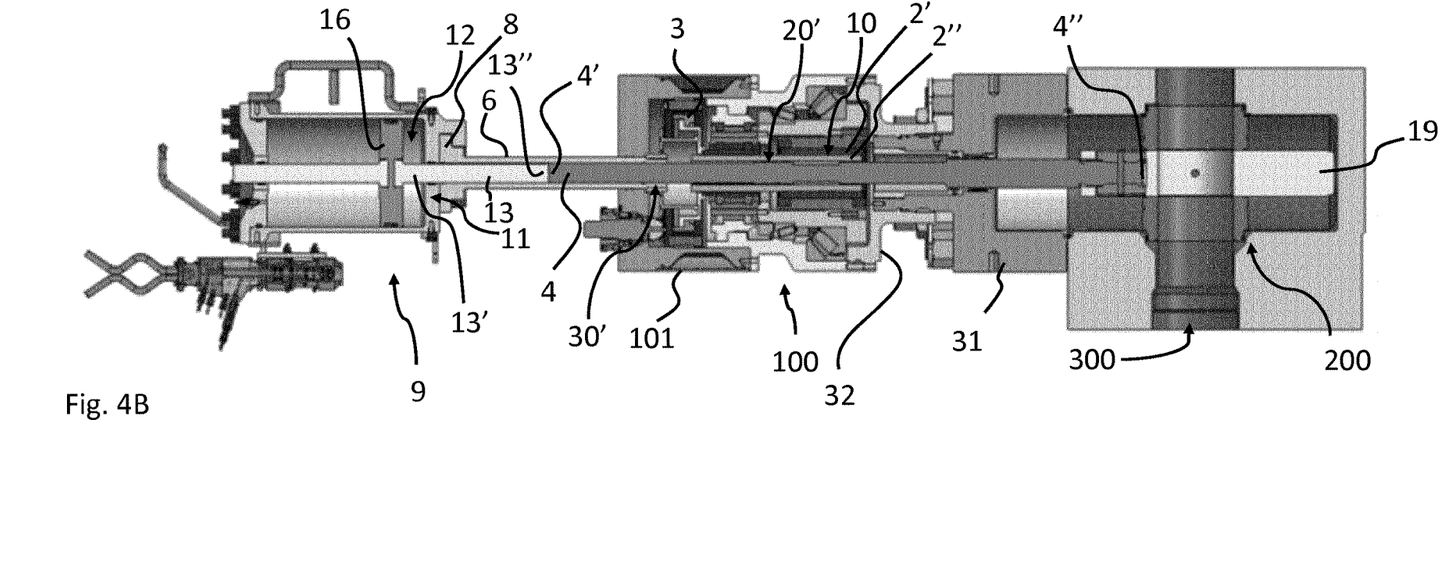
FIG. 4B is a cross section along a vertical plane along the axial extension of the subsea actuator according to a first aspect, with override tool of FIG. 4A.

In the override operation mode, se FIGS. 3B, 3C and 4B, the override housing 6 is rotated by an appropriate override tool 9 which can be operated by a ROV or a diver. The override housing 6 comprises an interface 8 for connection with an override tool 9. The override tool 9 comprises a rotation device 11 for rotating the override housing 6 relative the gate rod 4 such as to disconnect the third connection 30', and a pushing tool 12 for pushing the gate rod 4 and thus the linear valve 200 to an open position of the valve when the third connection 30' has been disconnected.

The override housing 6 may further comprise a stopper 14 for interaction with a stopper surface 15 of the actuator housing 101. The stopper surface 15 prevents axial movement of the gate rod 4 and override housing 6 in a first direction when the third connection 30' is disconnected.

With reference to FIG. 4B, the pushing tool 12 may include hydraulic operation by fluid pressure acting on a piston 16 in the override tool 9. The piston 16 may be connected to a first end 13' of a piston rod 13 and where a second end 13" of the piston rod 13 may be in connection with a first end portion 4' of the gate rod 4. When hydraulic fluid pressure is applied to the piston 16, the piston 16 and piston rod 13 are moved axially thereby pushing the gate rod 4 and the gate element 19 in the linear valve 200 axially, towards an open position of the linear valve 200. The override function may thus be an override function in one axial direction only.

Consequently, when disconnecting the third connection, the override housing 6 is rotated relative the gate rod 4 thereby disconnecting the override housing 6 from the gate rod 4. If used in shallow waters, one or more divers can perform the override procedure instead of a ROV. This disconnection results in that the inner roller screw part 2" is disconnected from the gate rod 4 thereby providing for the possibility of moving the gate rod 4 axially relative the inner roller screw part 2". The spline connection (see details in FIGS. 5A-5C), i.e. the second connection 20', between the gate rod 4 and the inner roller screw part 2" allows for axial movement but prevents rotational movement of the gate rod 4 relative the inner roller screw part 2". In other words, the spline connection enables the possibility of rotating the override housing 6 relative the gate rod 4 such that the third connection 30' is disconnected and the gate rod 4 is free to move axially relative the inner roller screw part 2". Once the threaded connection, i.e. the third connection 30', between the override housing 6 and the gate rod 4 has been disconnected, the gate rod 4 is no longer restricted from movement by the inner roller screw part 2", and can be manipulated to be moved in the axial direction towards the linear valve 200, thereby moving the linear valve 200 to an open position where access to the area below the X-mas tree (i.e. below the linear valve 200) is allowed.

Figure 5A:
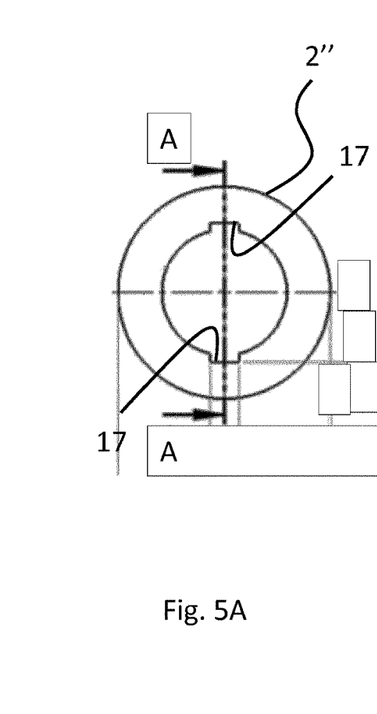
FIG. 5A is a view from an end and into the inner roller screw and show details of the spline connection between, i.e. the second connection, between the inner roller screw and the gate rod according to a first aspect of the invention.
Figures 5B, 5C:
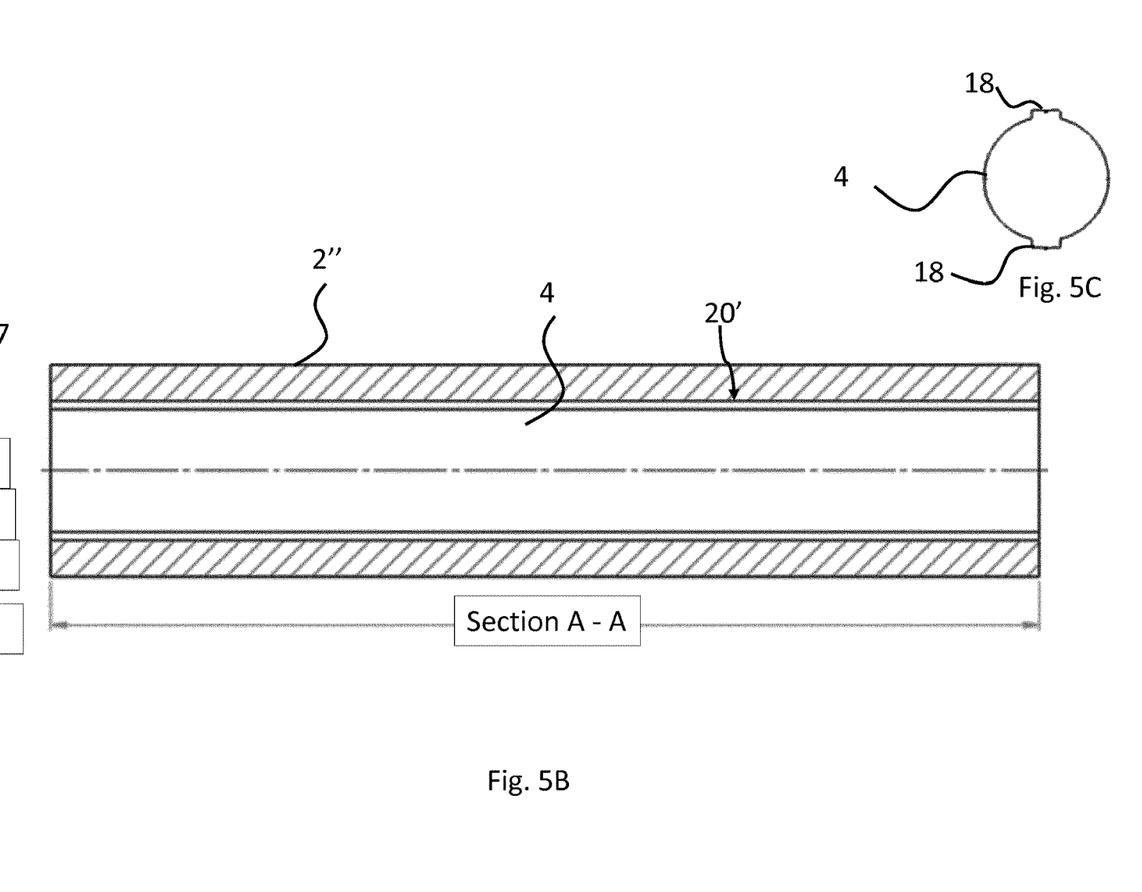
FIG. 5B is a view along section A-A in FIG. 5A according to a first aspect of the invention.
FIG. 5C is a view from an end and into the gate rod and shows details of keys provided at the external surface of the gate rod according to a first aspect of the invention.

FIG. 5A is a view from an end and into the inner roller screw 2" and show details of the spline connection, i.e. the second connection, between the inner roller screw 2" and the gate rod 4 (see FIG. 5B). FIG. 5B is a view along section A-A in FIG. 5A. Fig. C is a view from the end of the gate rod 4 and shows details of the key(s) 18 configured to interact with the recesses 17 in the inner roller screw part 2". The second connection 20' is exemplified as a spline connection where key(s) 18 on the gate rod 4 are disclosed for interaction with complementary formed recess(es) 17 in the inner roller screw part 2". The keys 18 are arranged on the gate rod 4 while two recesses 18 are arranged on the inner roller screw part 2". Although two keys 18 and two recesses 17 are disclosed, it is possible to have only one key 18 and one recess 17 as well as more than two keys 18 and recesses 17.

Second Aspect of the Invention, FIGS. 6-10

The second aspect has many of the same features as the first aspect, however there are a few differences which will be described in the following, and with reference to FIGS. 6-10. For example, according to the second aspect, the override function is a two-way override function operating the linear valve 200 to an open position of the valve 200 or a closed position of the valve 200. In addition, the roller screw 2 is prevented from rotation by a non-rotational part of the actuator 100, such that any torque from the roller screw 2 is transferred to a bonnet or front cap instead of being transferred to the gate rod/stem.

In order to better illustrate of the components differing from the first aspect, the subsea electric actuator 100 has been omitted from FIGS. 6-10. The electric actuator is the same actuator as described in relation to the first aspect of the invention and will thus not be described in further detail with respect to the second aspect.

Figure 6A:
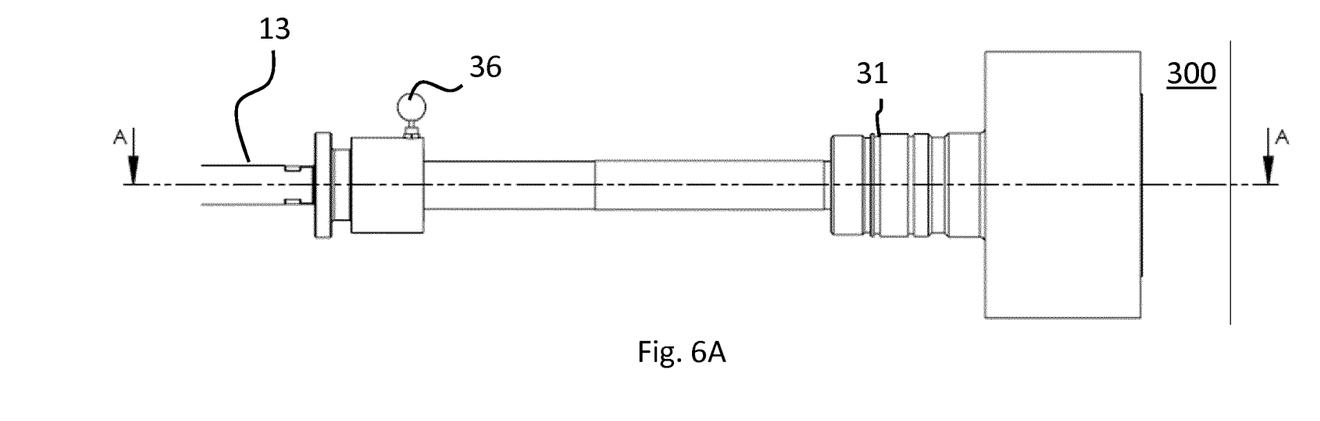
FIG. 6A shows a second aspect of the invention and discloses that override pushing tool pulls (or pushes) the gate rod thereby pulling (or pushing) the valve element out of the bore to open (or close) the bore.

FIG. 6A shows a second aspect of the invention and discloses that an override pushing tool 12 (see FIGS. 7A-7B) pulls (or pushes) the gate rod 4 thereby pulling (or pushing) the gate element (not shown in FIG. 6A, see FIG. 6B) out of the bore 300 to open (or close) the bore 300.

Figure 6B:
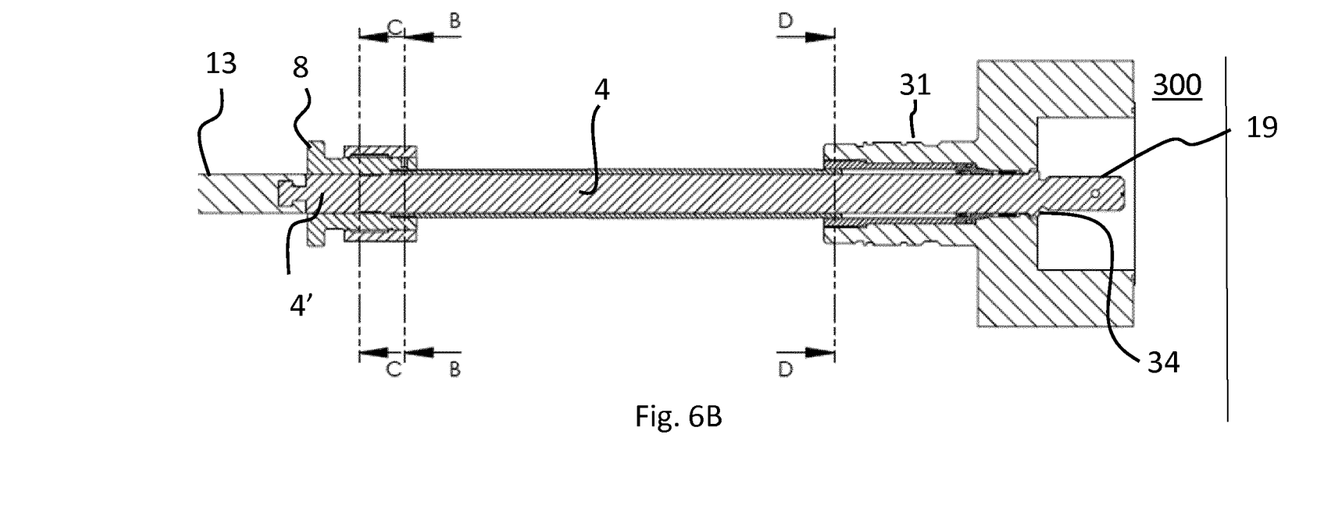
FIG. 6B is a view of the cross-section A-A of FIG. 6A.

FIG. 6B is a view of the cross-section A-A of FIG. 6A and shows the gate element 19 in a position where the bore 300 is open.

Figure 7A:
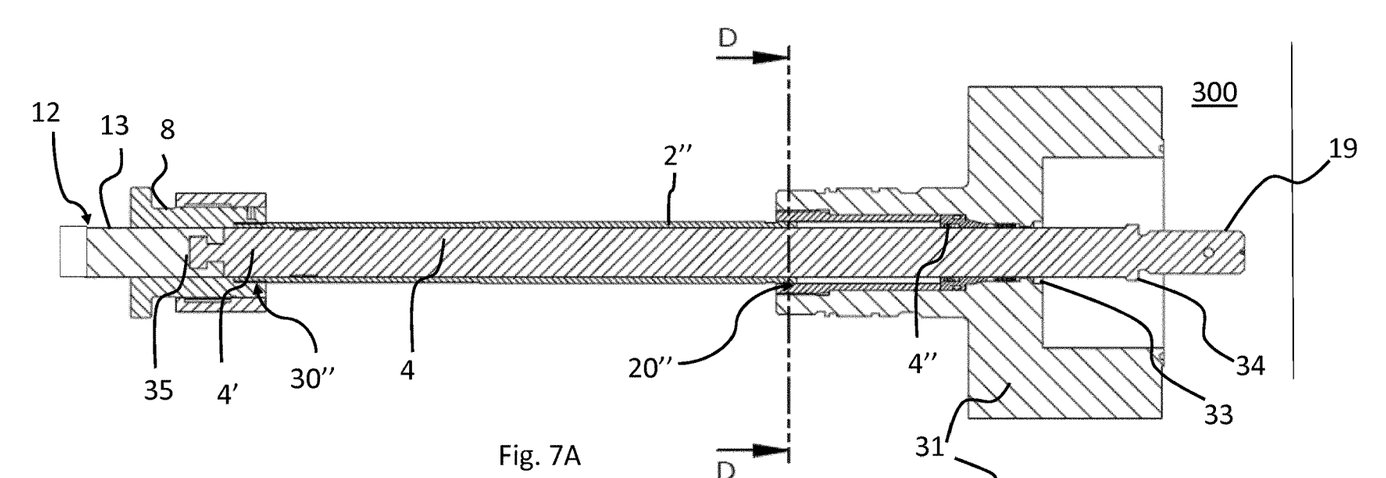
FIG. 7A shows that the override pushing tool pushes (or pulls) the gate rod and illustrates the middle of the sequence, represented by that the bore is partly closed as the valve element is halfway pushed (or retracted) into (or out of) the bore thereby closing (or opening) the bore.

FIG. 7A shows that the override pushing tool 12 pushes (or pulls) the gate rod 4 and illustrates the middle of the sequence, represented by that the bore 300 is partly closed as the gate element 19 is halfway pushed into, or alternatively retracted out of, the 300 bore thereby closing, or opening, the bore 300.

Figure 7B:
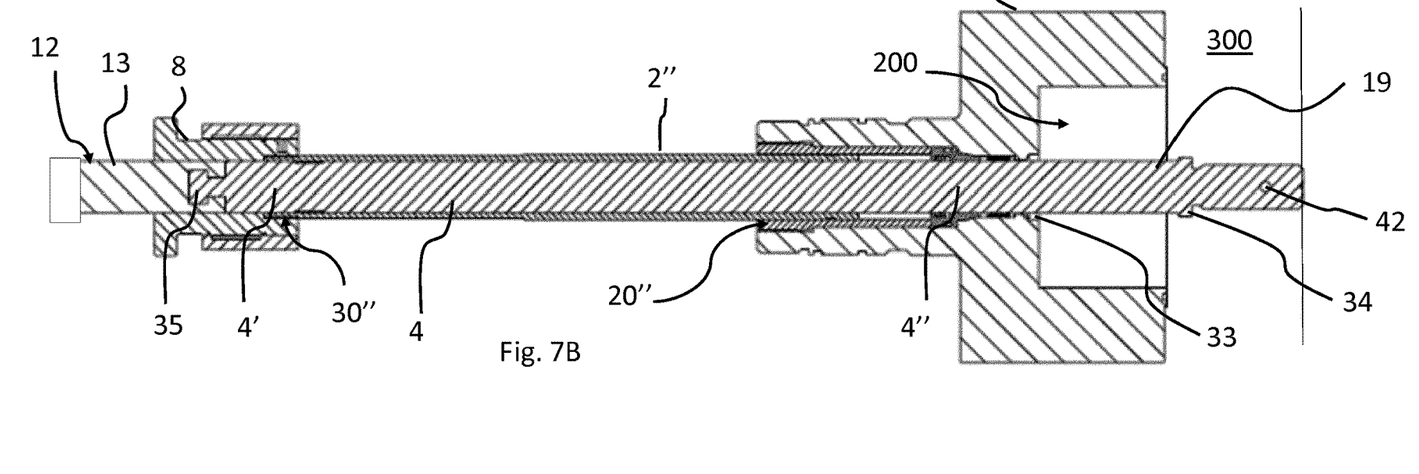
FIG. 7B shows that the override tool, i.e. the pushing tool of the override tool, has pushed the gate rod, and thus the valve element to a position where the bore is open.

FIG. 7B shows that the override tool, exemplified as a piston rod 13 in pushing tool 12 of the override tool, has pushed the gate rod 4, and thus the gate element 19 to a position where the bore 300 is open represented by the hole 42 in the gate valve 200.

Figure 8A:
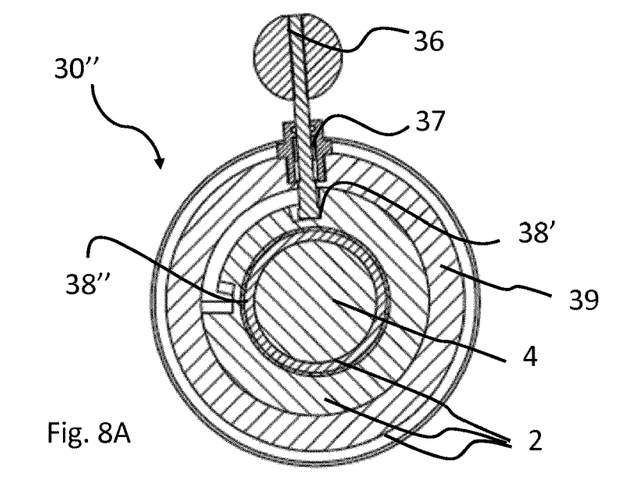
FIG. 8A is a view of cross section B-B of FIG. 6B, and shows details of the third connection, in a situation where the gate rod and roller screw are disconnected due to locking dog(s) are pushed out of stem lock grooves.

FIG. 8A is a view of cross section B-B of FIG. 6B, and shows details of the third connection 30", in a situation where the gate rod 4 and roller screw 2 are disconnected due to locking dog(s) 41', 41", 41''' having been pushed out into stem lock grooves 40', 40", 40'''.

Figure 8B:
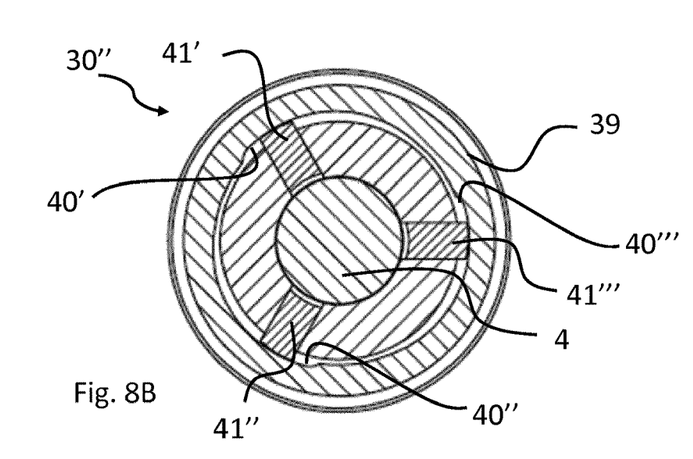
FIG. 8B is a view of cross section C-C of FIG. 6B, and shows details of the third connection, in a situation where the gate rod and roller screw are disconnected due to locking dog(s) are pushed out of stem lock grooves.

FIG. 8B is a view of cross section C-C of FIG. 6B, and shows details of the third connection 30", in a situation where the gate rod 4 and roller screw 2 are disconnected due to locking dog(s) having been pushed out into stem lock grooves 40', 40", 40'''.

Figure 9A:
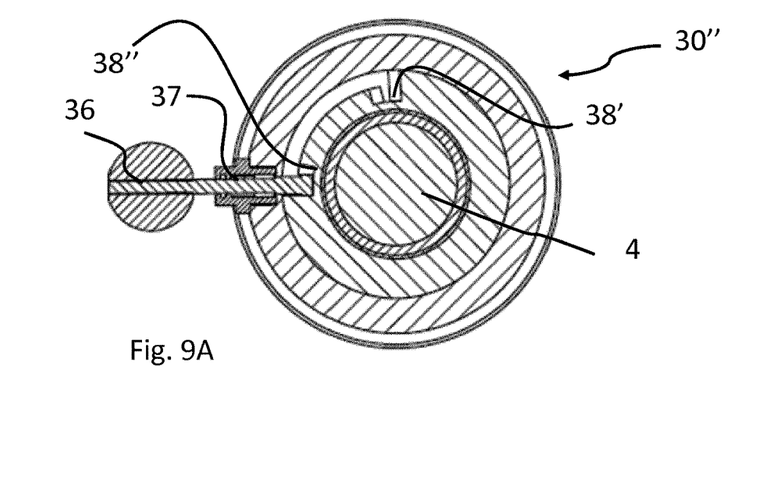
FIG. 9A is a view of cross section B-B of FIG. 6B, and shows details of the third connection, in a situation where gate rod and roller screw are connected with locking dog(s)

FIG. 9A is a view of cross section B-B of FIG. 6B, and shows details of the third connection, in a situation where gate rod 4 and roller screw 2 are connected with locking dog(s) 41', 41", 41'''.

Figure 9B:
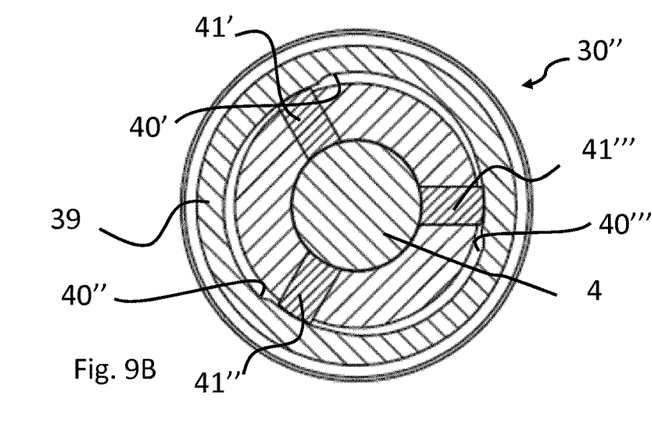
FIG. 9B is a view of cross section C-C of FIG. 6B, and shows details of the third connection, in a situation where gate rod and roller screw are connected with locking dog(s)

FIG. 9B is a view of cross section C-C of FIG. 6B, and shows details of the third connection, in a situation where gate rod 4 and roller screw 2 are connected with locking dog(s) 41', 41", 41'''.

Figure 10:
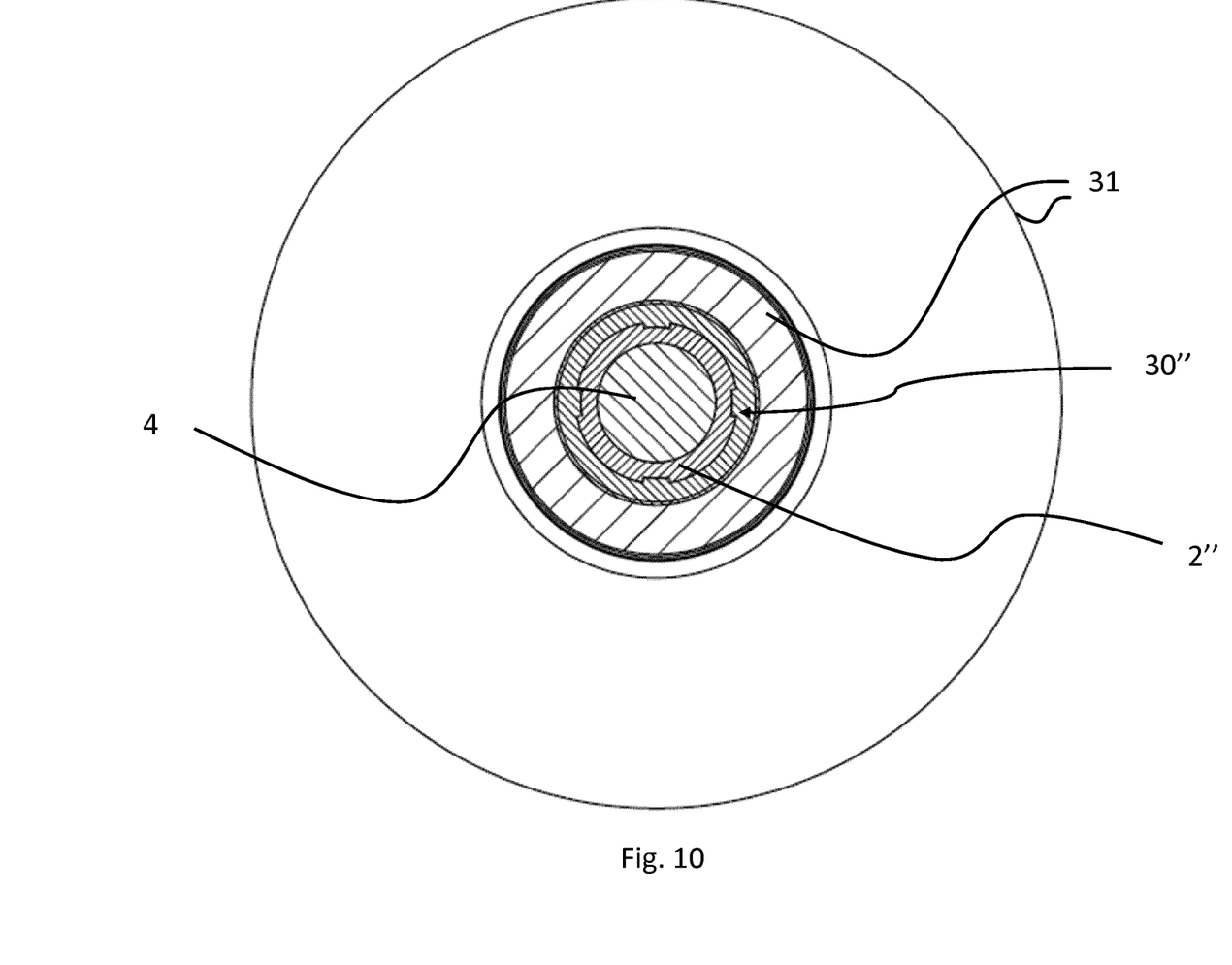
FIG. 10 is a view of cross section D-D of FIG. 6B, and shows details of the second connection and the torque transfer between the roller screw and the body of the bonnet.

FIG. 10 is a view of cross section D-D of FIG. 6B, and shows details of the second connection and the torque transfer between the roller screw 2 and the body of the bonnet 31.

The main difference between the first and second aspects is that, according to the second aspect, the second connection 20" is formed between an external surface of the inner roller screw part 2" and a non-rotational part of the actuator in the form of a bonnet 31 or a front cap 32 in, or connection with, the actuator housing 101, forming the second connection 20". The third connection 30" is between an interface on the external surface of the gate rod 4 and override housing via locking dog(s)/locking stem(s) 41', 41", 41'''.

The external surface comprising comprises locking groove(s) 40', 40", 40''' for receiving locking dog(s)/locking stem(s) 41', 41", 41''' (see FIGS. 8A, 8B, 9A, 9B) in the override housing 6, thereby axially locking the gate rod 4, the inner roller screw part 2" and the override housing 6 to each other, i.e. at least axial locking, but also rotational locking can be achieved, through the third connection 30". The first connection is the same as in the first aspect, and is not shown in FIGS. 6-10.

Referring to FIGS. 8A and 8B, the disconnection of the second connection 20" is illustrated, where the gate rod 4 and roller screw parts 2, 2', 2" are disconnected due to locking dogs/locking stems 41', 41", 41''' are moved radially outwardly into contact with locking grooves 40', 40", 40''' in the locking cap 39.

Referring to FIGS. 9A and 9B, however, the connection of the second connection 20" between gate rod 4 and roller screw parts 2, 2', 2" is disclosed. The gate rod 4 and roller screw parts 2, 2', 2" connect because the locking arm 36 with a pre-tensioned spring 37 have been manipulated by e.g. a ROV out of locking connection with first locking recess 38' (FIG. 8A) to rotate 90 degrees into locking connection with second locking recess 38". Because the locking arm 36 is connected to rotate with the locking cap 39, the locking 39 is also rotated during the movement of the locking arm from the first locking recess 38' to the second locking recess 38". When the locking arm 36 is locked in the second recess 38", the locking dogs/locking stems 41', 41", 41''' are pushed radially inwardly by the smaller diameter of the locking cap 39 (i.e. portions of the locking cap 39 without locking grooves 40', 40", 40''') such as to connect the gate rod 4, roller screw 2, 2', 2" to the override housing The gate rod 4 may in the second aspect comprise an interface 35 rendering possible both pushing and pulling by a ROV pushing (and/or pulling tool) 12. Similarly, the ROV pushing (and/or pulling) tool 12 has an interface which cooperates with the interface 35 of the gate rod 4.

The actuator housing is connected to a front cap 32 (see FIG. 1, 3C or 4B). The front cap is connected to a bonnet 31 through a male/female connection, where the front cap 32 is the female part and the bonnet 31 the male part of the connection. In this setup, the bonnet 31 forms the non-rotational part of the actuator. The bonnet 31 is connected to the pipe where the bore 300 and gate valve 200 is arranged. It is clear that the male/female connection relationship between the front cap 32 and the bonnet 31 can be switched, i.e. the front cap 32 can form the male part of the connection and the bonnet 31 can form the female part of the connection. In this latter setup, the non-rotational part of the actuator is the front cap 32. Thus, in this aspect, any torque is transferred to the bonnet 31 or the front cap 32 (dependent on which part is the male part in the connection and thus the non-rotational part of the second connection 20"). As the bonnet 31 and front cap 32 do not rotate, i.e. they are prevented from rotation, any torque will not influence the roller screw parts nor the gate rod 4, thus reducing risk of malfunction.

The bonnet 31 comprises stopper surface 33 for interaction with a projection 34 on the gate rod 4 thereby preventing the gate rod 4 from being retracted out of the bonnet 31.

Referring to FIG. 10 it is shown a view of cross section D-D of FIG. 6B, and shows details of the second connection 20" and the torque transfer between the roller screw 2, 2', 2" and the body of the bonnet 31. The second connection 20" can be, as illustrated, splines or keys locking the roller screw 2 against rotation by the bonnet 31.

The override tool in the second aspect, may manipulate the gate rod 4 to move in both directions, i.e. both to be pulled and pushed. The locking of the locking dogs to the gate rod/roller screw allows this dual movement. This means that the override tool, in the second aspect of the invention can be used both to open the bore 300 and to close the bore 300 by moving the gate element 19 inwardly to close the bore 300 or outwardly to open the bore 300.

It should be recognized that, while the present invention has been described in relation to the preferred embodiments thereof, those skilled in the art may develop a wide variation of structural and operational details without departing from the principles of the invention as defined in the attached claims.

| Reference list: | |
|---|---|
| 100 | Subsea electric actuator |
| 101 | Actuator housing |
| 200 | Linear valve, gate valve |
| 300 | Bore |
| 2 | Roller screw |
| 2' | Outer roller screw |
| 2" | Inner roller screw |
| 3 | Motor |
| 4 | Gate rod |
| 4' | First end portion gate rod |
| 4" | Second end portion gate rod |
| 5 | First stop face |
| 6 | Override housing |
| 7 | Second stop face |
| 8 | Interface in override housing to override tool |
| 9 | Override tool |
| 10 | First connection |
| 11 | Rotation device |
| 12 | Pushing tool |
| 13 | Piston rod |
| 13' | First end piston rod |

| Reference list: | |
|---|---|
| 13" | Second end piston rod |
| 14 | stopper |
| 15 | Stopper surface |
| 16 | Piston |
| 17 | Recess |
| 18 | Key |
| 19 | Gate element |
| 20', 20" | Second connection |
| 30', 30" | Third connection |
| 31 | Bonnet |
| 32 | Front cap |
| 33 | Stop surface bonnet |
| 34 | Projection on gate rod |
| 35 | Interface for ROV pushing (and/or pulling) tool on gate rod |
| 36 | Locking arm |
| 37 | Spring |
| 38' | First locking recess |
| 38" | Second locking recess |
| 39 | Locking cap |
| 40', 40", 40"' | Locking groove in locking cap |
| 41', 41", 41"' | Locking stem |
| 42 | Hole in gate valve |

The invention claimed is:

1. A subsea electric actuator for operating a linear valve, the actuator comprising:
    a motor;
    an actuator housing;
    an outer roller screw part rotationally connected to the motor and comprising internal threads forming a first part of a first connection;
    an inner roller screw part comprising external threads forming a second part of the first connection and being arranged inside the outer roller screw part, the first connection being configured to translate rotational movement of the outer roller screw part to linear movement of the inner roller screw part, a surface of the inner roller screw part having a first interface forming a first part of a second connection connecting the inner roller screw part to a non-rotational part of the actuator, the second connection being configured to rotationally lock the inner roller screw part to the non-rotational part of the actuator, thereby resulting in linear movement of the inner roller screw part when the outer roller screw is rotated by the motor;
    a gate rod for operating the valve, the gate rod being arranged axially movable inside the inner roller screw part, an external surface of the gate rod comprising an interface forming a first part of a third connection; and
    an override housing arranged outside the gate rod and adjacent the inner roller screw part, the override housing forming an axial stop for the inner roller screw part and comprising an interface forming a second part of the third connection;
    wherein when the third connection is connected, the inner roller screw part is locked to the gate rod such that the gate rod follows axial movement of the inner roller screw part, and when the third connection is disconnected, the gate rod is allowed to move in the axial direction relative the inner roller screw part such that the linear valve can be operated independently of the motor, the outer roller screw part and the inner roller screw part.

2. The subsea electric actuator according to claim 1, wherein the surface of the inner roller screw part having the first interface is on an internal surface of the inner roller screw part and the non-rotational part of the actuator is the gate rod, and wherein the gate rod comprises:
- a second interface forming a second part of the second connection towards the inner roller screw part; and
- a first stop face at a first end portion of the gate rod for interaction with the inner roller screw part;
- wherein the interface on the external surface of the gate rod comprises external threads and is provided at an opposite second end portion of the inner roller screw part relative the first stop face; and
- wherein the axial stop formed by the override housing defines a second stop face for the inner roller screw part, and wherein the interface on the override housing forming a second part of the third connection comprises internal threads.

3. The subsea electric actuator according to claim 1, wherein the surface of the inner roller screw part having the first interface is on an external surface of the inner roller screw part and the non-rotational part of the actuator is a bonnet or a front cap of the actuator housing; and
- wherein the interface on the external surface of the gate rod comprises a locking groove for receiving a locking dog in the override housing, thereby axially locking the gate rod, the inner roller screw part and the override housing relative each other through the third connection (30").

4. The subsea electric actuator according to claim 1, wherein the linear valve is a gate valve.

5. The subsea electric actuator according to claim 1, wherein the second connection is a spline connection.

6. The subsea electric actuator according to claim 1, wherein the override function is a one-way override function operating the linear valve to an open position of the valve (200).

7. The subsea electric actuator according to claim 1, wherein the override function is a two-way override function operating the linear valve to an open position of the valve or a closed position of the valve.

8. The subsea electric actuator according to claim 1, wherein the override housing comprises an interface for connection with an override tool which comprises a rotation device for rotating the override housing relative the gate rod so as to disconnect the third connection and a pushing tool for pushing the gate rod when the third connection has been disconnected.

9. The subsea electric actuator according to claim 8, wherein the pushing tool includes a piston which is connected to a first end of a piston rod having a second end in connection with a first end portion of the gate rod, and wherein when hydraulic fluid pressure is applied to the piston, the piston and piston rod are moved axially to thereby push the gate rod and the linear valve axially towards an open position of the linear valve.

10. The subsea electric actuator according to claim 1, wherein the override housing comprises a stopper for interaction with a stopper surface of the actuator housing so as to prevent axial movement of the gate rod and the override housing in a first direction when the third connection is disconnected.

11. The subsea electric actuator according to claim 1, wherein the linear valve is adapted to open or close a bore in which the linear valve is arranged by moving the linear valve perpendicular to an axial extension of the bore, and wherein in a first position of the linear valve the bore is open and access through the bore is allowed, and in a second position of the linear valve the bore is closed and access through the bore is restricted.

12. A method of performing override of a subsea electric actuator for operating a linear valve, the actuator comprising:
- a motor;
- an actuator housing;
- an outer roller screw part rotationally connected to the motor and comprising internal threads forming a first part of a first connection;
- an inner roller screw part comprising external threads forming a second part of the first connection and being arranged inside the outer roller screw part, the first connection being configured to translate rotational movement of the outer roller screw part to linear movement of the inner roller screw part, a surface of the inner roller screw part having a first interface forming a first part of a second connection connecting the inner roller screw part to a non-rotational part of the actuator, the second connection being configured to rotationally lock the inner roller screw part to the non-rotational part of the actuator, thereby resulting in linear movement of the inner roller screw part when the outer roller screw is rotated by the motor;
- a gate rod for operating the valve, the gate rod being arranged axially movable inside the inner roller screw part, an external surface of the gate rod comprising an interface forming a first part of a third connection; and
- an override housing arranged outside the gate rod and adjacent the inner roller screw part, the override housing forming an axial stop for the inner roller screw part and comprising an interface forming a second part of the third connection;
- wherein when the third connection is connected, the inner roller screw part is locked to the gate rod such that the gate rod follows axial movement of the inner roller screw part, and when the third connection is disconnected, the gate rod is allowed to move in the axial direction relative the inner roller screw part such that the linear valve can be operated independently of the motor, the outer roller screw part and the inner roller screw part;
- wherein the method comprises the steps of:
  - connecting an override tool to an interface on the override housing, the override tool comprising a rotation device and a pushing tool;
  - operating the rotation device to rotate the override housing relative the gate rod such as to disconnect the third connection; and
  - operating the pushing tool to push the gate rod an axial direction relative the inner roller screw part to thereby operate the linear valve independently of the motor, the outer roller screw part and the inner roller screw part (2").

13. The method according to claim 12, wherein the pushing tool comprises a piston which is connected to a first end of a piston rod having a second end in connection with a first end portion of the gate rod, and wherein the method comprises the step of:
- applying hydraulic fluid pressure to the piston so as to axially move the piston and piston rod to push the gate rod and the linear valve towards an open position of the linear valve.

* * * * *